S. W. MERRICK.
AMALGAMATOR.
APPLICATION FILED MAY 6, 1912.

1,055,777.

Patented Mar. 11, 1913.

3 SHEETS—SHEET 1.

S. W. MERRICK.
AMALGAMATOR.
APPLICATION FILED MAY 6, 1912.

1,055,777.

Patented Mar. 11, 1913.
3 SHEETS—SHEET 3.

WITNESSES
Geo. W. Naylor
C. F. Murdock

INVENTOR
Samuel W. Merrick
BY Munn & Co
ATTORNEYS

UNITED STATES PATENT OFFICE.

SAMUEL WHELPLEY MERRICK, OF MADISON, WISCONSIN.

AMALGAMATOR.

1,055,777.   Specification of Letters Patent.   Patented Mar. 11, 1913.

Application filed May 6, 1912. Serial No. 695,388.

*To all whom it may concern:*

Be it known that I, SAMUEL W. MERRICK, a citizen of the United States, and a resident of Madison, in the county of Dane and State of Wisconsin, have invented a new and Improved Amalgamator, of which the following is a full, clear, and exact description.

Among the principal objects which the present invention has in view are: to provide a conveyer trough with settling members to permit the separation of the ore and lighter materials; to provide means for promoting amalgamation in said settling members, and for raising the flow material and gangue from the settling members; to provide a trough or flume and screw conveyers therefor, said conveyers being provided with means for clearing the bottom of the trough without damage thereto; and to provide means for removing and replacing said settling members from the delivery trough or flume, without discontinuing the operation of the same.

Reference is to be had to the accompanying drawings forming a part of this specification, in which similar characters of reference indicate corresponding parts in all the views, and in which—

Figure 1:
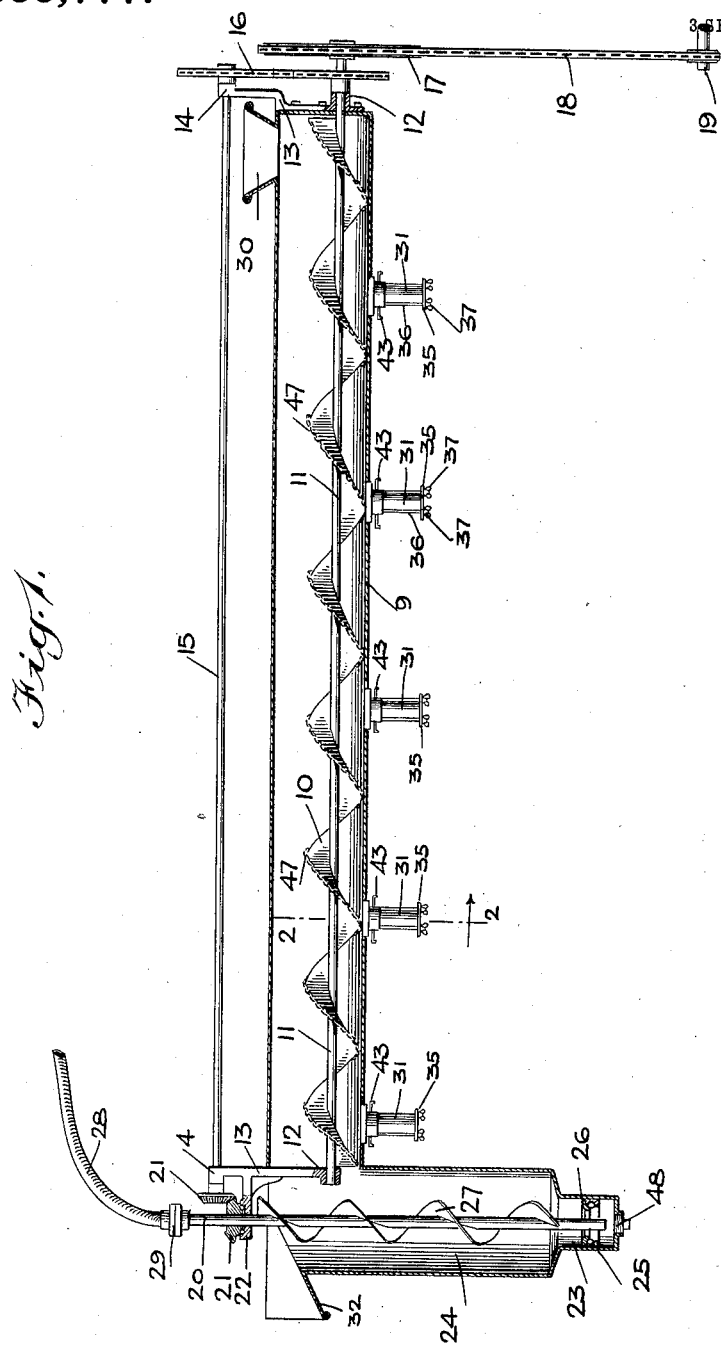
Figure 2:
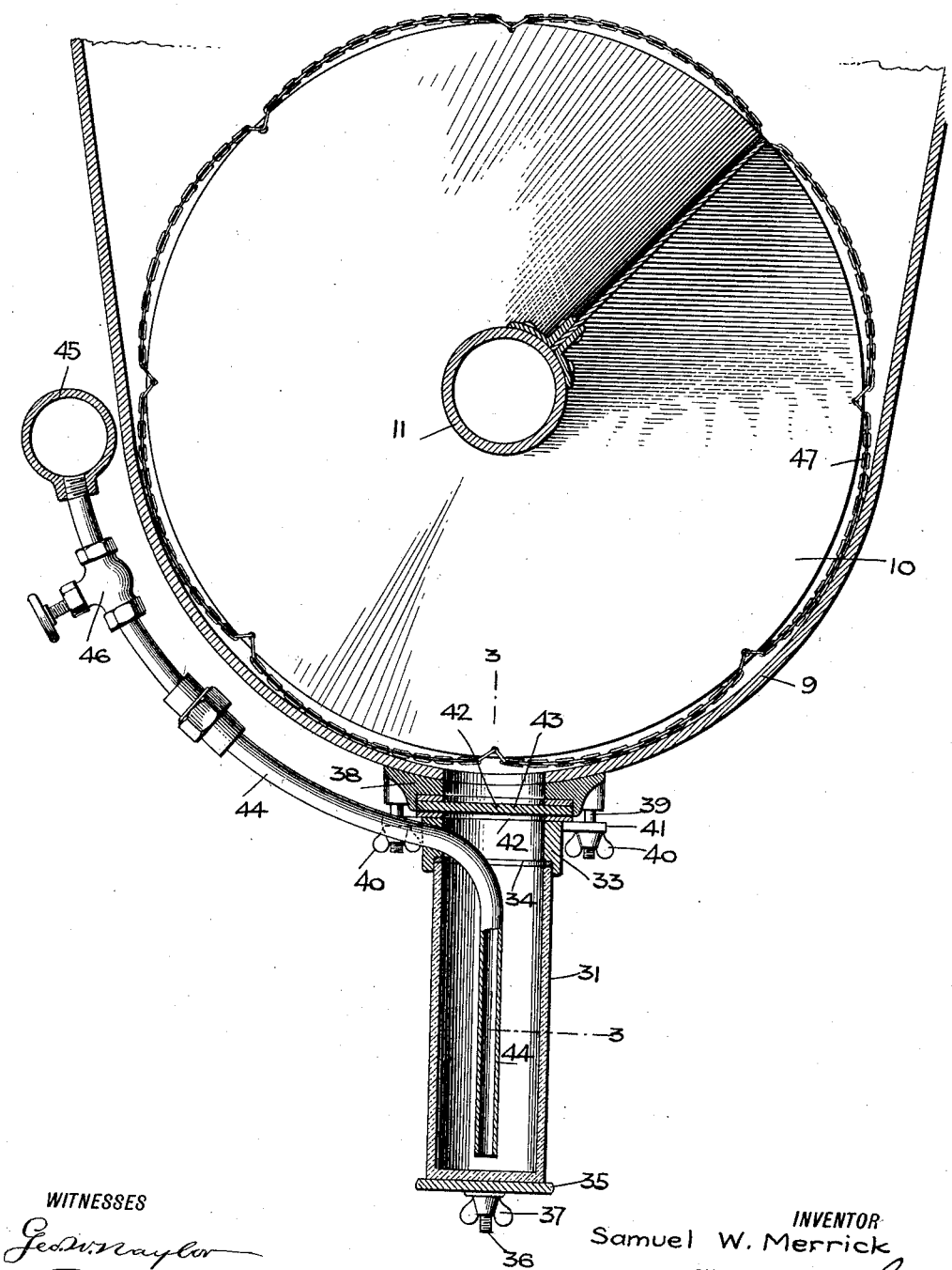
Figure 3:
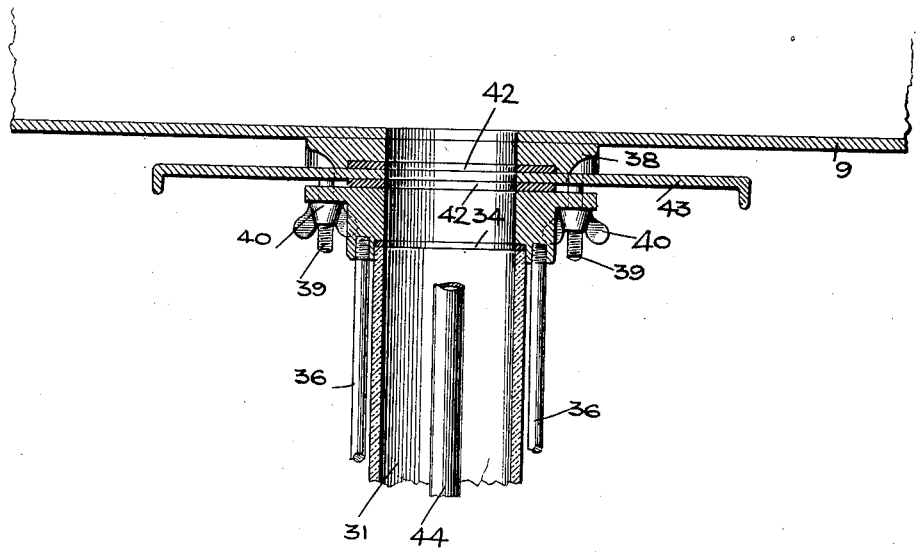
Figure 4:
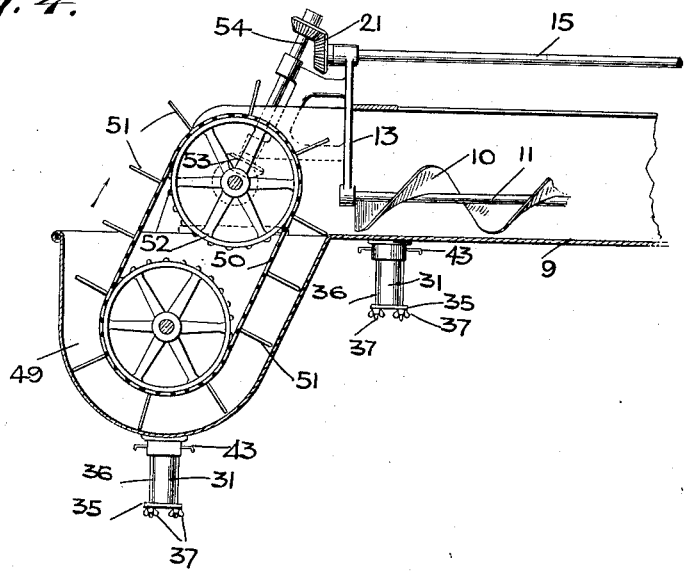

Figure 1 is a longitudinal vertical section of a delivery trough, showing therein screw conveyers, amalgamating jars, a water-supply, and driving mechanism, all constructed and arranged in accordance with the present invention; Fig. 2 is a detail view, on an enlarged scale, showing in section the trough, conveyer, and amalgamating jar above referred to, the section being taken on the line 2—2 in Fig. 1; Fig. 3 is a detail view, on an enlarged scale, showing a fragment of the delivery trough and an amalgamating jar connected therewith, the section being taken on the line 3—3 in Fig. 2; and Fig. 4 is a detail view, showing in longitudinal vertical section a fragment of the delivery trough, at the delivery end thereof, provided with a modified form of the delivery mechanism.

The present invention has more particular relation to mining machinery employed where placer mining is practised, or where the gangue is pulverized in suitable mills and delivered to a trough, to be subjected to a water bath, for the purpose of liberating the lighter materials, to be separated by gravity from the contained gold or other precious metal. For this purpose, the trough 9 is provided with a spiral conveyer 10, which is mounted upon a shaft 11 supported in bearings 12 formed in supporting brackets 13 disposed at each end of said trough. The brackets 13 provide bearings 14 at the upper end, to support the transmission shaft 15. The shafts 11 and 15 are each provided with gear wheels suitably connected by a pulley or sprocket chain 16 at the end of the shaft adjacent the driven pulley 17. The pulley 17 is connected by a belt or by the chain 18, with a driving shaft 19 of any suitable form of power supply. The conveyer end of the shaft 15 is operatively connected with a vertical shaft 20, through a transmission miter gear 21. The shaft 20 is vertically supported on ball bearings provided in a bracket extension 22, and upon the side wall of a well 23, with which the vertical settling tank 24 is provided. The ball bearings referred to may be constructed in any approved manner. That shown in the drawings at the top consists in forming a ball race in the bracket extension 22, at the upper side thereof and in the gear 21, at the under side thereof. The bearing formed adjacent the lower end of the shaft 20 consists of a ring 25, in which a ball race is formed, and a spider 26 fixedly mounted on the shaft 20, in the under side whereof a ball race is formed to register with the race in the ring 25. The shaft 20 is tubular, and is provided with a spiral flange 27. At the upper end of the shaft 20 is connected a water-supply pipe 28, the connection being made by means of a swivel connection, or by fitted water-tight collars 29 of any suitable construction. The collar 29 attached to the shaft 20 rotates therewith, while the collar 29 attached to the pipe 28 is non-rotative. When thus constructed, the operation involving the mechanism is as follows:—Pulp or dust is delivered to the trough 9 through a hopper 30, and into the water contained in said trough, where it is thoroughly saturated, and where the agitation promotes the separation, by gravity, of the metal and the gangue or detritus. In the operation of the conveyer 10, the pulp is carried downward for submergence in the water, until the heavier particles, becoming separated from the lighter, are retained by their own weight at the bottom of the trough 9. Here they are advanced along the trough by the operation of the spiral vane or flange of the conveyer 10, until, on reaching the opening of each of the amalgamating jars 31, they are deposited in said jars. Several of the jars 31 are provided so that the separation of the metal from the gangue is gradually and completely performed, and when performed, is subjected to the mercury contained in any of the various jars 31. Finally, the pulp is carried into the settling tank 24, where the heavier material settles and enters the well 23, wherein is contained mercury for the purpose of forming an amalgam with any of the freed or partially-liberated gold. The lighter materials are delivered from the tank 24 by way of a spout 32. The necessary agitation of the water in the tank 24 is provided by the flange 27, the shaft 20 being rotated, power for which purpose is supplied from the transmission shafts 15 and miter gear 21.

As seen best in Fig. 2 of drawings, the jaws 31 are constructed of vitreous material, best suited for containing the mercury with which said jars are charged. The jars are each held in position to fit collars 33. The collars 33 are recessed, to provide a seat for a packing 34, rendering the joint between the collars and the jars water-tight. The jars are each held against the collars 33 and packing 34 by a table 35. The table 35 is supported on hanger rods 36, which pass through perforations formed in said tables, and are threaded to receive wing nuts 37, upon which said tables rest. The rods 36 are suspended from the collar 33. The plates 38 are each perforated to form a passage therethrough, to register with perforations formed in the bottom of said trough. The plates 38 are structurally united with the trough 9, and are provided with bolts 39 for suspending the collars 33. The bolts 39 are threaded to receive wing nuts 40, which are introduced below, to bear upon, tabs 41 on the collar 33, to support said collar and adjust the same to regulate the pressure of the ring plates 42 upon a valve plate 43.

The water supply for the trough 9 is introduced through the various jars 31, into which it is delivered by pipes 44. The pipes 44 are closely fitted in and extended through the collars 33, and are connected to a water-main 45 in the manner best shown in Fig. 2 of drawings. The supply of water to each of the pipes 44 is regulated by manipulating a valve 46 provided on each of the pipes 44. By introducing the water supply for the trough 9 in this manner, it will be seen that a current is constantly established, passing upward in each of the jars 31. This movement of the water against the incoming pulp or ore forms a wash for the same, which aids in the separation of the gangue or detritus from the metal.

By introducing, as is done, the delivery end of each pipe 44 below the major portion of the mercury charge of each jar, the mercury contained therein is continuously agitated, and thereby preserved in its most active condition. If at any time the mercury in any particular jar loses its efficiency, it may be rejuvenated by any of the well known agents employed for this purpose, by introducing into the water supply the necessary agent.

As the mercury in each of the jars 31 unites with the metal to its maximum capacity, it becomes desirable to remove the jars 31, and to do this without suspending the operation of the plant. In the present instance, provision is made for the removal of the jars 31 by employing the valve plates 43, which, when closed, completely cut off the communication between the trough and any one particular jar 31 and collar 33 connected therewith. After cutting off the communication between any particular jar and the trough, the valve 46 on the pipe 44 communicating with said jar is closed, so that the water supply to the jar is suspended. This does not affect the operation of the remaining jars. The water supply being suspended, the plate 43 is moved from the position shown in Fig. 3 of drawings, until the solid body of the plate 43 is disposed across the passage formed through the plate 38 and collar 33. By now loosening the wing nuts 37, the table 35 may be removed from the rods 36, to permit the removal of the jar 31. The jar 31 is now emptied of the amalgam for treatment, and recovered, recharged, and returned to operative position. The recharged jar being locked in position, the plate 43 is moved to open the passage between said jar and the trough 9, and the operation of amalgamation is renewed in the jar while other jars are being removed, recharged and replaced.

The conveyer 10 is provided with a chain 47, which is loosely mounted at the edge of the flange forming said conveyer, and is designed to wipe loosely the bottom and sides adjacent the bottom of the trough 9. The wiping or scraping action thus performed by the chain 47 effectually advances any material which might otherwise settle on the bottom of the trough, while avoiding unnecessary wear on said trough. The chain 47 is secured to the flange forming the conveyer 10 at suitable intervals and in any suitable manner, to form flexible or yielding sections between the fastening stations.

The well 23 is charged with mercury in a manner similar to that above described with reference to the jars 31. It is presumed that the amount of metal which will pass over from the trough 9 to the tank 24 will be slight, and the deposit of mercury in the well 23 is calculated to care for a full-run period of the plant. When it is desired to withdraw the mercury from the well 23, this is accomplished by removing the plug 48 at the bottom thereof, to drain the mercury from said well.

In Fig. 4 of drawings, a modified form of the delivery tank is shown. In lieu of the tank 24, a hopper-shaped receptacle 49 is provided, at the bottom of which is mounted a jar 31, in all respects of construction and function resembling the jars 31 above described. The modification consists principally in providing an endless belt 50, having a number of paddles 51, by which the pulp or heavy matter delivered from the trough 9 is moved through the receptacle 49 and passed over the jar 31, to be permitted to enter the same provided the specific gravity of the material is such as to promote such action. The belt 50 is mounted on two sprocket wheels 52, one of which is operatively connected, by means of miter gears 53 and a short shaft 54, to the transmission shaft 15.

In the modified form of the delivery tank or receptacle 49, the water supply delivered by means of the shaft 20 below the mercury in the well 23 is dispensed with. The water thus introduced into the well 23 forms a part of the water-supply system for the plant, but is separated, to provide an extra agitation without increasing the force of the water introduced into the various jars 31. In this manner, when using the preferred form of tank 24 with the independent water supply referred to, the delivery of the waste water and material is accelerated.

Having thus described my invention, I claim as new and desire to secure by Letters Patent:—

1. In an apparatus such as described, the combination of a washing trough having a curved bottom; a rotary spiral conveyer mounted in said trough, the periphery of said conveyer being spaced apart from the surface of said trough; a continuous flexible member mounted upon the periphery of said spiral conveyer, to wipe the surface of said trough; and means for attaching said flexible member upon said conveyer at intervals to form loop sections on said conveyer.

2. In an apparatus such as described, the combination of an elongated washing trough having a plurality of delivery openings serially arranged in the bottom of said trough; a rotary spiral conveyer mounted on said trough to agitate and advance the material in said trough; independent means for closing each of said openings; a plurality of independent mercury-charged receptacles to register with said openings; means for removably securing said receptacles upon said trough below said closure means for said openings; and a water-supply pipe for each of said receptacles, each of said pipes being supported by said trough, to extend within said receptacles, above the upper edge thereof.

3. In an apparatus such as described, the combination of an elongated washing trough having a plurality of delivery openings serially arranged in the bottom of said trough; a rotary spiral conveyer mounted on said trough to agitate and advance the material in said trough; independent means for closing each of said openings; a plurality of independent mercury-charged receptacles to register with said openings; means for removably securing said receptacles upon said trough below said closure means for said openings; a water-supply pipe for each of said receptacles, each of said pipes being supported by said trough, to extend within said receptacles, above the upper edge thereof; and means mounted on each of said pipes for independently controlling the flow of water into each of said receptacles.

In testimony whereof I have signed my name to this specification in the presence of two subscribing witnesses.

SAMUEL WHELPLEY MERRICK.

Witnesses:
F. C. HUTSON,
C. A. HOLT.